United States Patent [19]

Samarughi et al.

[11] Patent Number: 5,999,229
[45] Date of Patent: *Dec. 7, 1999

[54] TV PICTURE CONTROL SYSTEM WITH GENERATION OF SIGNALS FOR INSTANTANEOUS BLANKING OR BLURRING OF THE VIDEO SIGNAL WHILE LEAVING THE AUDIO SIGNAL AUDIBLE

[75] Inventors: Mario Samarughi, Via Madesimo 15, Rome, Italy, 1-00135; Massimo Mengarelli, Rome, Italy

[73] Assignee: Mario Samarughi, Roma, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/718,938

[22] Filed: Sep. 24, 1996

[30] Foreign Application Priority Data

Sep. 27, 1995 [IT] Italy .............................. RM95A000639

[51] Int. Cl.⁶ ....................................................... H04N 3/24
[52] U.S. Cl. ........................................... 348/634; 348/633
[58] Field of Search .................................... 348/734, 634, 348/633, 636, 682, 5.5; H04N 5/44, 3/24

[56] References Cited

U.S. PATENT DOCUMENTS

| | | |
|---|---|---|
| 4,229,765 | 10/1980 | Sanger ..................................... 348/633 |
| 4,417,278 | 11/1983 | Hensleigh et al. . |
| 4,520,404 | 5/1985 | Von Kohorn . |
| 4,554,584 | 11/1985 | Elam et al. ............................. 348/633 |
| 4,716,469 | 12/1987 | Kim et al. . |
| 5,056,138 | 10/1991 | Tyson, Sr. ................................ 380/10 |
| 5,195,135 | 3/1993 | Palmer . |
| 5,387,942 | 2/1995 | Lemelson ............................... 348/633 |
| 5,537,612 | 7/1996 | Cherrick et al. ........................ 348/5.5 |
| B1 4,554,584 | 4/1998 | Elam et al. . |

FOREIGN PATENT DOCUMENTS 9205599 9/1992 Germany .

Primary Examiner—Michael H. Lee
Attorney, Agent, or Firm—Wenderoth, Lind & Ponack, L.L.P.

[57] ABSTRACT

A TV picture control system includes a remote-control having standard input keys, a processing unit and a transmission transducer. The system also includes a TV set having a receiving transducer, a remote-control signal amplifying circuit, a remote-control signal-decoding processing unit and a luminance/chrominance circuit. The remote-control additionally has supplementary input keys for the instantaneous blanking and/or instantaneous blurring of the TV program video signal while leaving the audio signal active. The TV set additionally has first and/or second supplementary control outputs of the remote-control signal-decoding processing unit and circuitry for the instantaneous blanking and/or instantaneous blurring of the TV program video signal.

27 Claims, 10 Drawing Sheets

TV PICTURE CONTROL SYSTEM WITH GENERATION OF SIGNALS FOR INSTANTANEOUS BLANKING OR BLURRING OF THE VIDEO SIGNAL WHILE LEAVING THE AUDIO SIGNAL AUDIBLE

BACKGROUND OF THE INVENTION

1. Field of the Invention

The present invention relates to a television picture control system which, through a remote-control, generates signals for the instantaneous blanking and/or blurring of the video signal, while leaving the audio signal active.

2. Description of the Prior Art

FIG. 1 shows a block diagram of a prior art system for controlling a television (TV) picture. A TV set 1 and a TV remote-control 2 are remotely connected to one another via wireless communication, for example, by infrared signals. The remote-control 2 has a "standard" input 3 for receiving input commands for controlling various standard television functions. Such a standard input 3 usually includes remote-control keys and a matrix enabling structure. The actuation of each remote-control key short-circuits one of the crossings of this matrix. In this way, standard signals a3, whose frequency or digital code serves to control the TV set, are produced. The "standard" signals include signals normally provided by commercially available TV sets, i.e., signals for controlling the volume, brightness, contrast and color saturation adjustment, for finding programs and/or TV stations, for switching on and off the TV set, for "muting" the sound, etc. The remote-control 2 also has a remote-control processing unit 4 for receiving the standard signals a3 produced by standard input 3. A transducer 5 receives the signals a4 from the remote-control processing unit 4 and outputs them to the TV set 1. Correspondingly, the TV set 1 has a receiving transducer 6 for receiving the signals from the transmission transducer 5. The TV set also has a remote-control signal-amplifying circuit 7 for receiving signals a6 from the receiving transducer 6. A signal-decoding processing unit 8 receives the signals a7 from the remote-control signal-amplifying circuit 7, and processes and routes them inside the TV set 1 according to their functions. The processing unit 8 is equipped with a plurality of standard outputs a8. These outputs can be activated in accordance with standard signals a3 emitted by the standard signal input means 3. The TV set 1 also has a luminance/chrominance circuit not shown in the figure.

The prior art embodiment, however, allows television pictures of a violent or otherwise undesirable nature to be viewed by children or others who are often unconscious viewers of scenes unsuitable and dangerous to them. Therefore, there is a need for a device which would permit the instantaneous blanking of these undesired video signals while leaving the audio signal active the listening of it can be helpful to the subsequent restoring of the video function, as well as for other purposes later described.

SUMMARY OF THE INVENTION

The best way to satisfy such need is to provide a supplementary key on a TV remote control which, when activated, allows the instantaneously blanking of the video only in a similar manner to the way a "mute" key blanks the television's sound suppressing instantaneously the audio signal. Such a key would suppress the light emission of the CRT (cathode ray tube) for a time interval desired by users. When the video signal is blanked, the video screen appears as though the TV set were switched off. Currently, such a function of video blanking can be obtained in two different modes, each having some disadvantages. In the first one, a prolonged actuation of the brightness and contrast keys one after the other is necessary until obtaining the desired result. This procedure takes a long time, often precious in these cases to avoid vision of the undesired scene, since the video blanking is gradual, not instantaneous. Secondly, the known but uncommon "video text" mode can be used. Very few TV sets are equipped with this mode and users must view undesired text lines. Furthermore, the light emission of the CRT is always present. Moreover, the key for activating the video text function is generally different from the one for deactivating it. Lastly, the video signal blanking function cannot be implemented by changing the channel or by switching off the TV set since viewers would not be able to identify the right time in which to restore the program.

Furthermore, an alternative need, in case additional, is to provide a supplementary remote-control key for instantaneously blurring the video signal of the selected TV station for a time interval desired by users, in this case too leaving the audio signal active. While blurred, the picture would only be guessed and intelligible to adult viewers. The same picture, by losing clearness or definition would not allow the unpleasant and delicate particulars of the TV program to be comprehended by minors. Blurring can be useful when the content of the video signal is decisive for adult viewers to understand the program and when the program contains pictures not suitable to minors.

The TV picture control system of the present invention includes a TV set and a TV remote-control which allows a user to blank or blur the television picture. The remote-control includes an input for receiving standard commands and for generating standard signals to control the TV picture. A processing unit in the remote-control processes the standard signals received from the input. A transmission transducer receives the signals processed by the remote-control processing unit and outputs them to the TV set. The TV set has a corresponding receiving transducer for receiving the signals from the transmission transducer of the remote-control. A remote-control signal-amplifying circuit receives the signals produced by the receiving transducer and amplifies them inside the TV set. The TV set also includes a remote-control signal-decoding processing unit for receiving the signals from the remote-control signal-amplifying circuit and for processing and routing them inside the TV set according to their functions. The TV set has a plurality of standard outputs which can be activated in accordance with the standard signals emitted by the input. The TV set also includes a luminance-chrominance circuit.

The system additionally includes a supplementary input located in the TV remote-control to allow supplementary commands to be input by the user. These supplementary commands cause the generation of first and/or second supplementary signals for the instantaneous blanking and/or instantaneous blurring, respectively, of the video signal of the TV program. The remote-control processing unit, transmission and receiving transducers, remote-control signal amplifier and signal-decoding processing unit facilitate the first and second supplementary signals in the same way as they facilitate the standard signals.

The remote-control signal-decoding processing unit of the TV includes first and/or second supplementary control outputs which can be activated respectively upon activation of the first and/or second supplementary signals generated by the supplementary input.

The TV set includes circuitry for instantaneously blanking and/or instantaneously blurring the video signal of the TV program in response to the first and/or second supplementary control outputs, respectively. The circuitry for the instantaneous video blanking and the circuitry for the instantaneous video blurring can be switched from an operating condition to a non-operating condition via activation of the respective supplementary control output. The operation of the instantaneous video blanking prevails over the operation of the instantaneous video blurring. If both instantaneous video blanking and instantaneous video blurring are activated, the video signal is blanked.

The present invention firstly aims at providing that, while the TV set switched on, the picture and the light emission by the CRT produced by the TV set are instantaneously suppressed to allow users, desiring not to view or make viewing the transmitted pictures, to make use of the audio signal only and thus to continue following the desired program, without being compelled to change seat or to turn their back to the TV set in order not to be disturbed by the picture or the light, and also without being compelled to switch off the TV set or to change channel. In this way, pictures or scenes which could reveal to be crude, obscene, immoral and violent are wholly eliminated or made harmless. This is obtained by actuating the first supplementary key of the remote-control one time only. The subsequent restoring of the video signal is obtained too by actuating one time only the same supplementary key which has caused the instantaneous blanking. Same considerations are to be applied for the blurring.

As far as the function of video signal instantaneous blanking is concerned, it could further aim at making the users' eyes have a rest and allowing them continuing to follow however the desired program (i.e. political and cultural talk-shows wherein the picture is not important), even if limitedly to the audio signal only, by remaining seated in front of the TV set without any viewing disturb. Similarly to what already happens with the instantaneous turning off of the sound, with the instantaneous video blanking users will be no longer compelled to receive the program wholly, as they will be able to defend themselves at the right time from unpleasant pictures.

A further purpose, similar to the one previously described, is to allow users more to concentrate on the audio component of a particular program only, a musical piece for example or programs wherein the TV message is given both in audio and video mode at the same time, by disturbing the understanding and consequently compelling users to eliminate one of the two functions, audio or video, as they like. For example, the display on the screen of a written sheet which is also read by the speaker.

The originality of the present system in summary mainly consists in the possibility of using the TV set in one only of its two primary functions, audio-video, and more precisely in the audio function only, by means of a special supplementary key placed on the remote-control for the above mentioned specific function only, i.e. for instantaneously blanking of the video signal of a TV transmission by making the screen appear as the TV set were switched off; this key, not available up to now, is similar to the key which has been existing instead for few decades having the specific function of turning immediately off the sound signal of a TV transmission and making possible to use the TV set in its video function only. With all the resulting advantages, some of them here mentioned, based on the fact that users are put in a position to control instantaneously the TV programs in both primary functions and not only in the audio function.

BRIEF DESCRIPTION OF THE DRAWINGS

The present invention will be described with respect to specific embodiments to which the invention is not intended to be limited. In particular, both the function of instantaneous video blanking and the function of instantaneous video blurring can be present in the system simultaneously. It is, however, understood that embodiments of the present invention providing only one of the functions will be possible. The embodiments are illustrated in the following figures.

DETAILED DESCRIPTION OF THE INVENTION

Figure 1:
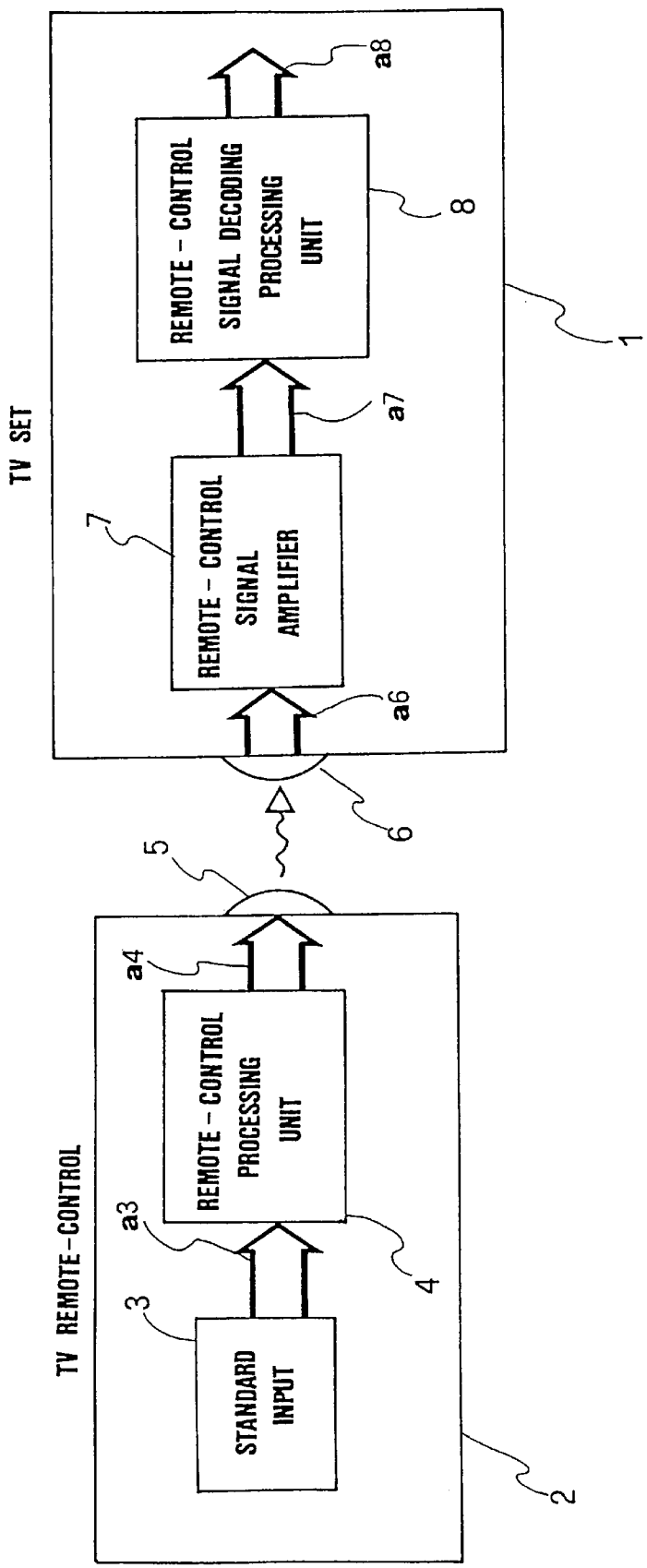
FIG. 1 is a block diagram of a prior art embodiment.
Figure 2:
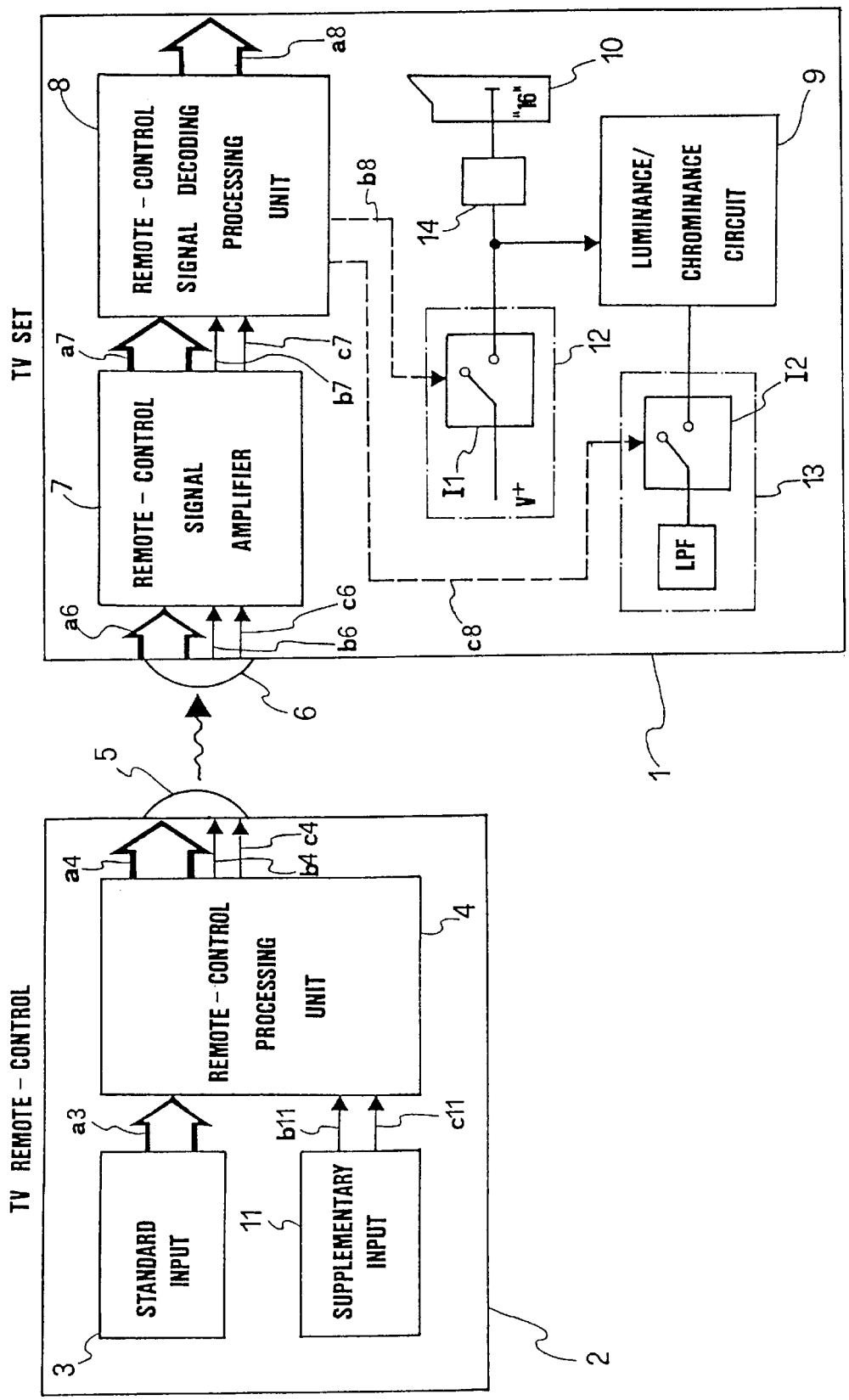
FIG. 2 is a block diagram of the embodiment according to the present invention.

Referring now to FIG. 2, a block diagram of the system according to the present invention and its differences with respect to the prior art embodiment described in the preceding FIG. 1 are shown. FIG. 2 shows, inside the remote-control 2, a supplementary input 11 for receiving supplementary commands for the instantaneous blanking and/or blurring of the TV program video signal. The supplementary input also generates first and second supplementary signals b11 and c11 for the instantaneous video blanking and instantaneous video blurring, respectively. The remote-control processing unit 4, the transmission and receiving transducers 5 and 6, the remote-control signal amplifier 7 and the signal-decoding processing unit 8 will also respond to the first and second supplementary signals b11 and c11. The supplementary input 11 includes two supplementary keys (not shown in figure). The first one is for the activation of instantaneous video blanking and the second one is for the activation of instantaneous video blurring. The matrix structure of the remote-control will have to consequently provide two supplementary crossings, sensitive to the actuation of the two supplementary keys. The short-circuiting of the these supplementary crossings causes the remote-control processing unit 4 to receive supplementary signals b11 and c11. The transducer 5 receives, from the remote-control processing unit 4, both the signals a4 and the signals b4 and c4, whose generation is a result of the generation of the signals b11 and ca11. The remote-control signal amplifying circuit 7 receives from the receiving transducer 6 both the standard signals a6 and the signals b6 and c6, which represent supplementary signals b11 and c11.

The signal decoding processing unit 8 comprises first and second supplementary control outputs b8 and c8. For this purpose, the TV set 1 comprises circuits 12 and 13 for the video signal instantaneous blanking and blurring, respectively. The video signal instantaneous blanking circuit 12 includes a switch I1, whose first end is connected to a positive voltage V+ and whose second end is connected to the luminance/chrominance circuit 9. The switching of the switch I1 is controlled by the first supplementary control output b8. It is known that the luminance/chrominance circuit 9 generally includes an integrated circuit, an input of which allows an instantaneous blanking of the video signal, once a suitable voltage is supplied to it. Namely, the video signal is led to a switching off level. In particular, a "high" voltage causes the instantaneous blanking of the video signal, whereas a "low" voltage allows the usual operation of the TV set. During the mode of video signal instantaneous blanking, a high voltage allows the variable video signals R, G, B, between one "blanking" pulse and the following one, to be replaced with a DC level equal to the black level of the signals R, G, B. If the luminance/chrominance circuit 9 does not include a video blanking input, an electric circuit for the replacement of the above-mentioned signals R, G, B can be implemented. Such a circuit is not described here in detail, as its implementation is considered to be known to the person skilled in the art.

When TV set 1 is equipped with a connector for EURO-AV signal, also known as a "SCART" connector, it is easy to determine where the voltage V+ should be connected. The SCART connector, indicated as numeral 10 in FIG. 2, now commonly used in European TV sets and compulsory in some countries, is a 21-input connector. The input "16" is connected directly to the instantaneous video blanking input of the luminance/chrominance circuit 9. Instantaneous video blanking is accomplished with an input voltage in the range of 1 to 3 V and normal TV operation occurs with voltages in the range of 0 to 0.4 V with an input resistance of 75 Ω. The second end of the switch I1 can be connected to any point along the connection between the input "16" of the SCART connector 10 and the input for the instantaneous video blanking of the integrated circuit inside the luminance/chrominance circuit 9. A "buffer" circuit 14 could be provided between the SCART connector 10 and the video signal instantaneous blanking means 12 in order to maintain the input impedance and voltage characteristics of the input "16" of the SCART connector. The buffer circuit 14 will be described by way of example by referring to FIG. 4C.

The video signal instantaneous blurring circuit 13 includes a switch I2 and a low-pass filter LPF. The first end of the switch I2 is connected to the low-pass filter LPF, whereas the second end of the switch 12 is connected to the luminance/chrominance circuit 9. The switching of the switch I2 is controlled by the second supplementary control output c8.

The activation of control outputs b8 and c8 resulting from the activation of the signals b11 and c11 respectively by the supplementary input means 11, allows the activation of the video signal instantaneous blanking or instantaneous blurring, respectively. The switches I1 and I2 can therefore be switched between a non-operating condition (open switch, shown in figure) for standard operation of the TV set 1 wherein the first and second supplementary control outputs b8, c8 are not active, and an operating condition (closed switch, not shown in figure) which causes the instantaneous blanking or the instantaneous blurring of the video signal, wherein at least one of the outputs b8, c8 is active.

In particular, the activation of the first supplementary control output b8 switches the switch I1 into its operating condition and effects the connection of the positive voltage V+ to the luminance/chrominance circuit 9 providing the instantaneous blanking of the video signal. The activation of the second supplementary control output c8 switches the switch I2 into the closed-switch condition and effects instead the connection of the low-pass filter LPF to the luminance/chrominance circuit 9. In this case, a low-pass filtering action inside the luminance/chrominance circuit 9 on the complete video signal (i.e., comprising both luminance and chrominance information) is effected. Particularly, the filtering will result in a drastically reduced video signal bandwidth, from approximately 5 MHz, to approximately 300 kHz. This reduction in bandwidth allows only a very limited intelligibility of the picture broadcast. The modes according to which such reduction is provided will be better described by referring to FIG. 4B. Different modes for the instantaneous video blurring will be subsequently described.

The switches I1 and I2 switch from a non-operating to an operating condition whenever the first and the second supplementary signals b11, c11 respectively are activated. In particular, the signals b7 and c7, whose respective activation results from the activation of the signals b11 and c11, are applied to bistable storage circuits in the remote-control signal decoding processing unit 8. When the first supplementary key is operated a first time by the user, the bistable storage circuit is activated, thus instantaneously blanking the video signal, whereas a second operation of the first supplementary key will deactivate the bistable storage circuit, thus instantaneously restoring the video signal. Likewise, a first operation of the second supplementary key will instantaneously blur the video signal and a second operation will instantaneously restore the video signal. However, when both functions of instantaneous video blanking and instantaneous video blurring are present, the activation of the instantaneous video signal blanking circuit 12 prevails over the activation of the instantaneous video signal blurring circuit 13. Deactivating the signal for the instantaneous video signal blanking after having activated the signal for the instantaneous video signal blurring will instantaneously restore the video signal blurring function on the TV set 1.

During the instantaneous video signal blanking mode or instantaneous video signal blurring mode, symbols indicating instantaneous video blanking or instantaneous video blurring, respectively, can be generated on the screen of the TV set 1. It may be preferable, however, to provide such symbols only for the instantaneous video blurring mode. The symbol would indicate that the TV is not malfunctioning. For the instantaneous video blanking mode, it would be better that such symbols not be shown, since they would draw the users' attention, thereby disturbing them. In fact, a TV screen sending out some quantity of light emission by the CRT, even if low, or showing a message, even if small, has a strong "enchanting" power on users, continuously drawing their attention.

Alternative embodiments could also be provided. In particular, the activation of the second signal c11 for the instantaneous blurring can apply a band-pass filter, instead of a low-pass filter, to the complete video signal, or the circuit 13 for the instantaneous video blurring can include a "scrambling" digital system of the video signal for reducing the intelligibility of the pictures displayed on the CRT.

Figure 3A:
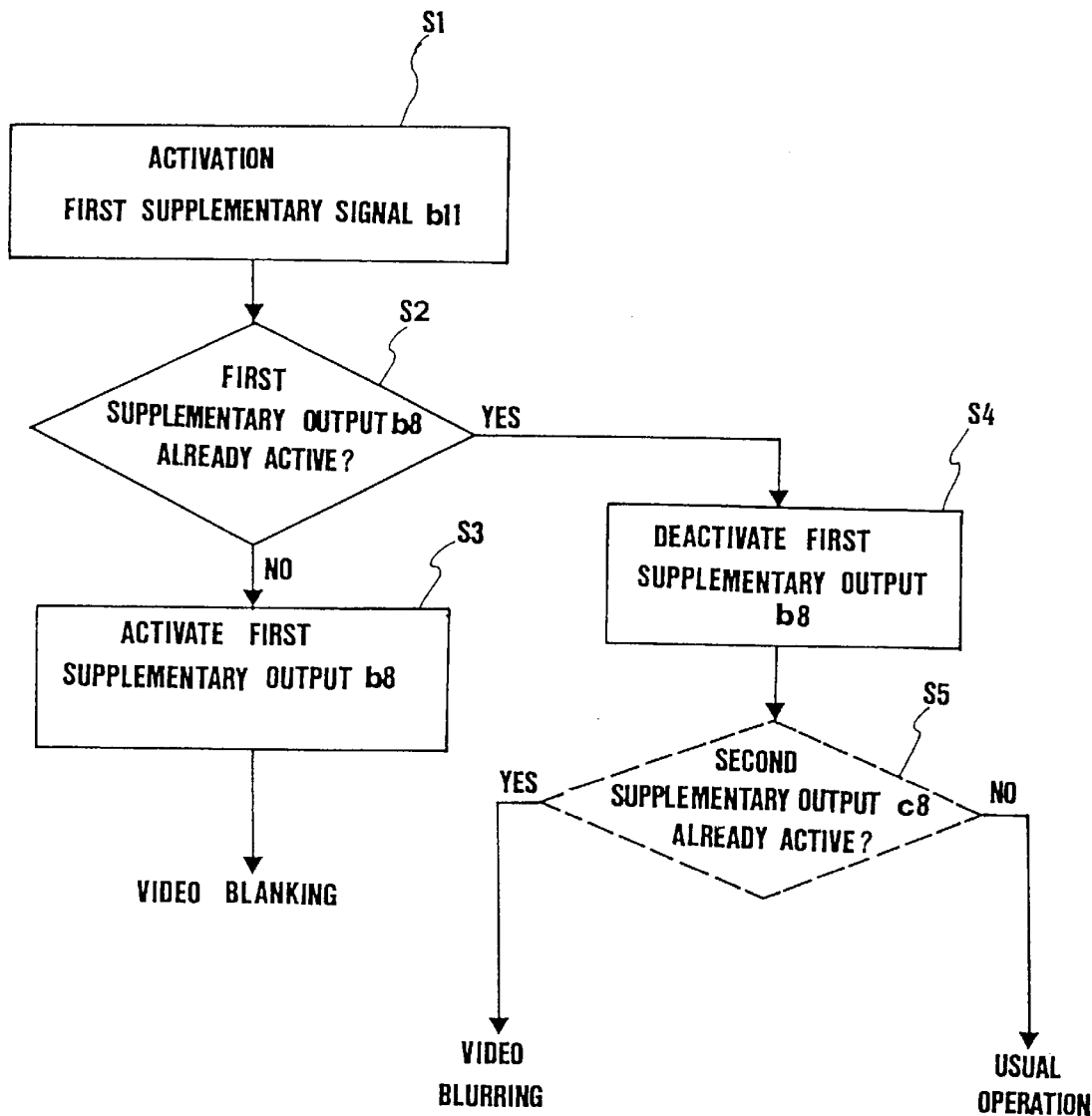
FIG. 3A and FIG. 3B are flow charts of an example of programming of the signal decoding processing unit 8.
Figure 3B:
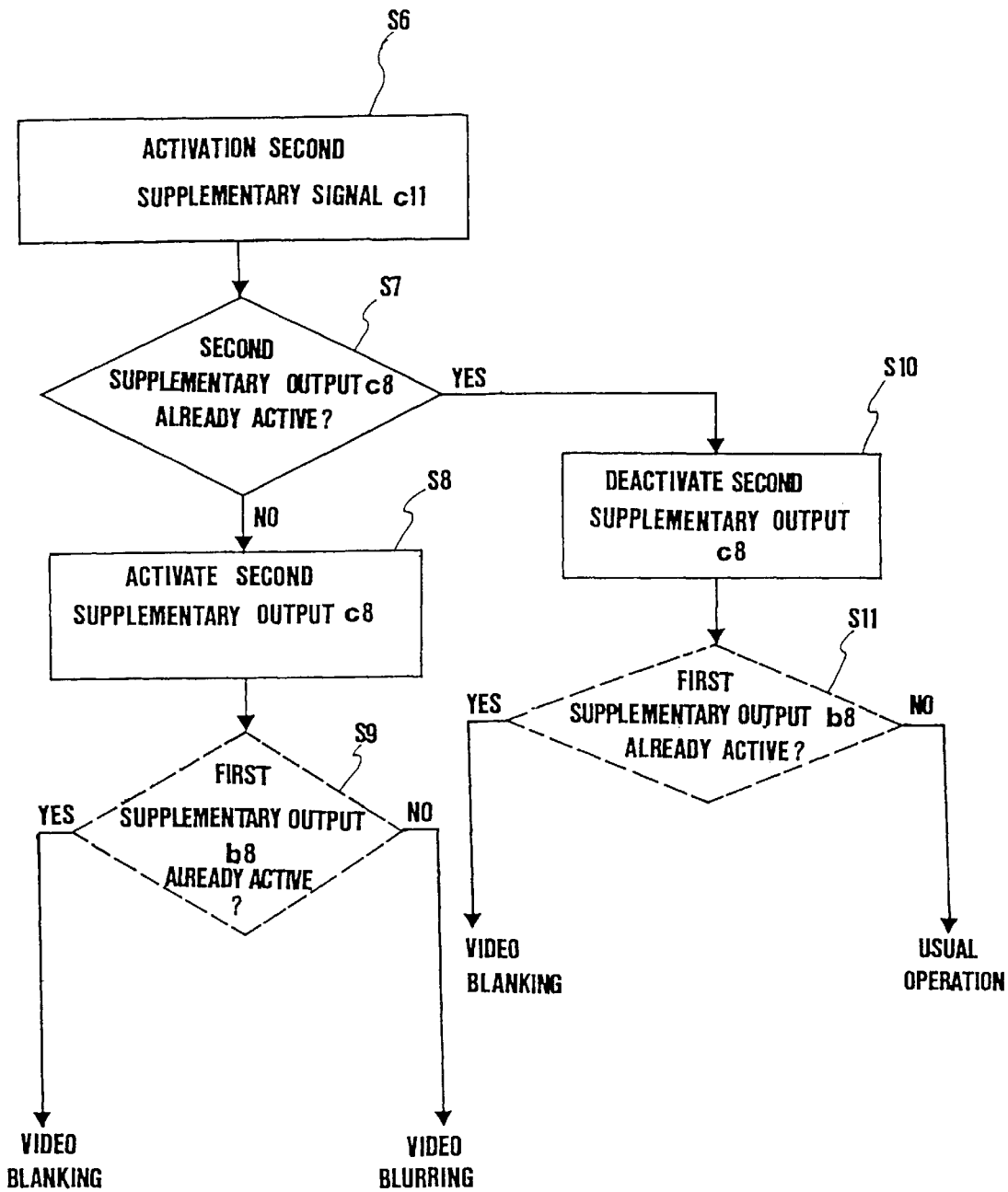

FIGS. 3A and 3B illustrate a flow-chart for an example of programming the signal decoding processing unit 8 so that the first and second supplementary outputs b8 and c8 can be activated respectively in connection with the first and second supplementary signals b11 and c11.

FIG. 3A shows the software modifications which have to be implemented on the signal decoding processing unit 8 with respect to the activation of the first supplementary signal b11. Upon activation of the first supplementary signal b11, occurring in the step S1, the flow proceeds to a decision-step S2, wherein it is checked whether the first supplementary output b8 is already active or not. In case it is not, the flow branches to a step S3, wherein the first supplementary output b8 is activated, causing the instantaneous blanking of the video signal. Otherwise, the flow proceeds to a step S4, wherein the first supplementary output b8 is deactivated. In said step S5, the deactivation of the first supplementary output, performed in the preceding step S4, restores the video signal blurring on the TV set 1 if the second supplementary output c8 is already active or effects usual operation if the second supplementary output c8 is not active.

FIG. 3B shows the software modifications which have to be implemented on the processing unit 8 with respect to the activation of the second supplementary signal c11. Upon activation of the second supplementary signal c11, occurring in step S6, the flow proceeds to a decision-step S7, wherein it is checked whether the second supplementary output c8 is already active or not. In case it is not, the flow branches to a step S8 wherein the second supplementary output c8 is activated. The step S9 shows by way of explanation how the activation of the second supplementary output c8 does not vary the video blanking mode in case the first supplementary output b8 is active.

If in step S7, the second supplementary output c8 is active, the flow proceeds to a step S10 wherein the second supplementary output is deactivated. The decision-step S11 shows how the deactivation of the second output c8 does not vary the video blanking mode in case the first supplementary output b8 is active.

Figure 4A:
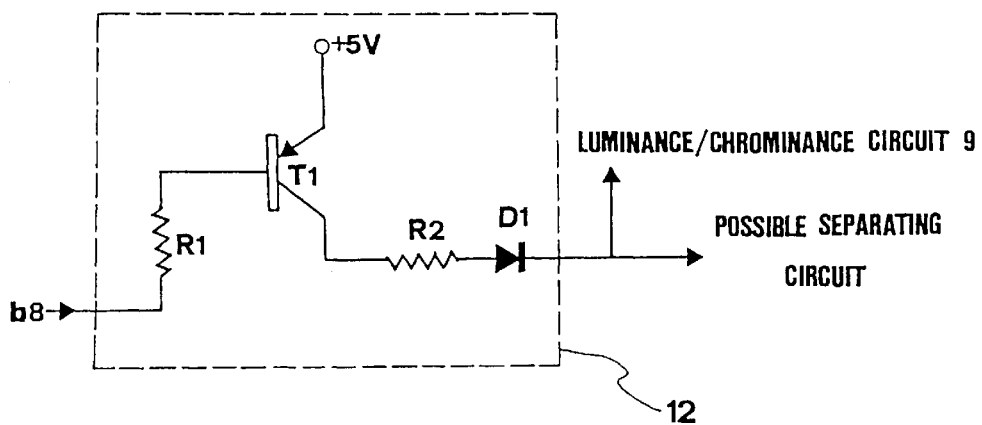
FIG. 4A and FIG. 4B are examples of embodiments of video blanking and video blurring means according to the present invention.

FIG. 4A shows by way of example circuit 12 for the instantaneous blanking of the video signal, already briefly described with reference to preceding FIG. 2. In particular, circuit 12 includes current-limiting resistors R1 and R2, a switching pnp transistor T1 and a diode D1. The supplementary output b8 of the processing unit 8 is connected to a first end of the resistor R1, whose second end is connected to the base of the transistor T1. The emitter of T1 is connected to the DC power supply of +5 V (V+ in FIG. 2), whereas the collector of the same is connected to a first end of the resistor R2, whose second end is connected to the anode of diode D1. The cathode of D1 is then connected to the luminance/chrominance circuit 9, possibly on the connection leading to the buffer device separating the input "16" of the SCART connector, if such a connector is present.

During operation, the activation of the first supplementary signal b11 will set the first supplementary output b8 to a logic low (0.2 V, for example). The transistor T1 will then start to conduct and a logic high will be input into the video blanking input of the luminance/chrominance circuit, by causing the instantaneous blanking of the video signal. The presence of the diode D1 is a "wired OR" circuit arrangement which allows the separation of instantaneous video signal blanking circuit 12 from outer signals. A subsequent activation of the first supplementary signal b11 will set the first supplementary output b8 at a logic high, by cutting off the transistor T1 and restoring the TV signal to the conditions preceding the blanking.

Figure 4B:
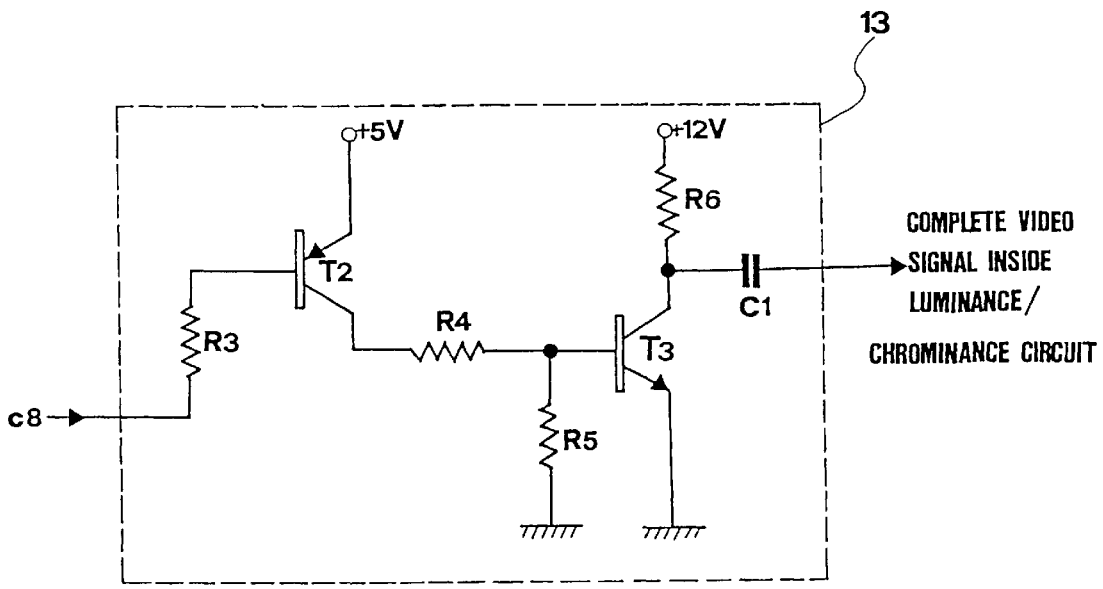

FIG. 4B shows an example of an embodiment of the video signal blurring circuit 13, already briefly described with reference to preceding FIG. 2. In particular, current-limiting resistors R3, R4, R5 and R6, a switching pnp transistor T2, a switching npn transistor T3 and a capacitor C1 are provided. The supplementary output c8 of the processing unit 8 is connected to a first end of the resistor R3, second end of which is connected to the base of the transistor T2. The emitter of T2 is connected to the DC power supply of +5 V, whereas the collector is connected to a first end of the resistor R4, whose second end is connected both to the first end of the resistor R5 and to the base of the transistor T3, the second end of the resistor R5 being grounded. The emitter of T3 is grounded, whereas the collector is connected both to a first end of the resistor R6 and to a first end of the capacitor C1. The second end of the resistor R6 is connected to the DC power supply of +12 V, whereas the second end of the capacitor C1 is connected to the complete video signal, i.e., comprising both luminance and chrominance information, but subsequent to the picking up of synchronism pulses so that the low-pass filtering does not influence the shape of the pulses, and therefore the phase and the synchronization of the picture.

During operation, when the second supplementary signal c11 sets the second supplementary output c8 at a logical low, the transistors T2 and T3 start to conduct. The transistor T3, in particular, once reaching saturation, short-circuits the capacitor C1 substantially to ground. In this way, a low-pass filter for the complete video signal is formed, together with the luminance/chrominance inner resistance seen from the capacitor C1 connecting point. By suitably selecting the capacitance of the capacitor C1, it is possible to obtain a desired reduction of the bandwidth of the complete video signal which is displayed on the CRT, by obtaining a cut-off frequency of 300 kHz, for example. A subsequent activation of the second supplementary signal c11 will set the second supplementary output c8 to a logic high, by cutting off the transistors T2 and T3 and restoring the TV signal to the conditions preceding the blurring. In particular, the values of the resistor R6, capacitor C1 and transistor T3 will be designed so as not to influence the complete video signal during the usual TV operation.

Figure 4C:
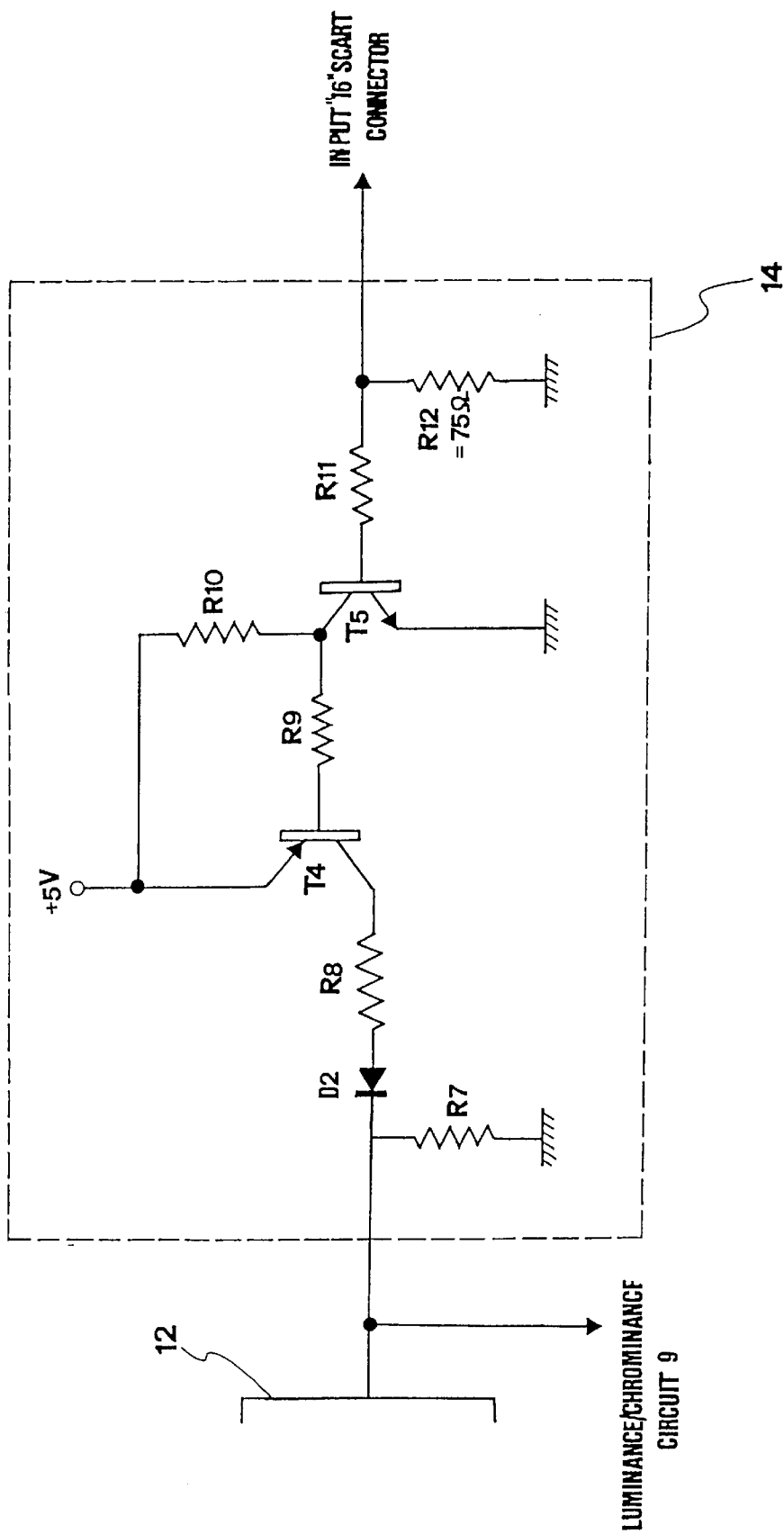
FIG. 4C is an example of an embodiment of a buffer circuit for a TV set equipped with a SCART connector.

FIG. 4C shows an example of the buffer circuit 14 described with reference to the preceding FIG. 2, in case the SCART connector 10 is provided. In particular, current-limiting resistors R7, R8, R9, R10, R11 and R12 are provided, as well as a switching pnp transistor T4, a switching npn transistor T5 and a diode D2. The output of the video signal blanking means 12 (see FIG. 4A) is connected to the luminance/chrominance circuit 9 (not shown in figure) to the cathode of diode D2 and to a first end of the resistor R7, whose second end is grounded. The anode of diode D2 is connected to a first end of the resistor R8 whose second end is connected to the collector of the transistor T4. The emitter of the transistor T4 is connected to a DC power supply of +5 V, whereas the base of the transistor T4 is connected, across R9, to the collector of the transistor T5 and to a first end of the resistor R10. The second end of the resistor R10 is connected to the DC power supply of +5 V. The emitter of the transistor T5 is grounded. The base of the transistor T5 is connected, across R11, to the input "16" of the SCART connector and to a first end of the resistor R12 of 75 Ω (standard value of the input resistance of the input "16" of the SCART connector), whose second end is grounded.

During operation, in case no blanking voltage is supplied to the luminance/chrominance circuit by the blanking circuit 12, the transistors T4 and T5 can be brought into conduction by an outer blanking signal (voltage 1–3 v) supplied to the input "16" of the SCART connector. This signal is transmitted, across D2, to the luminance/chrominance circuit 9. Even in case no blanking voltage is supplied by the blanking circuit 12, with no outer blanking signal supplied to the input "16" of the SCART connector (and thus voltage 0–0.4 v), the transistors T4 and T5 are cut-off, and no blanking occurs.

In case an instantaneous blanking is supplied by the blanking circuit 12 to the luminance/chrominance circuit, there is no change in the input characteristics of the input "16" of the SCART connector, seen from outside. A circuit "OR" is thus provided, whose inputs are the outputs of blanking circuit 12 and the input "16" of the SCART connector, and whose output leads to the luminance/chrominance circuit.

Figure 5A:
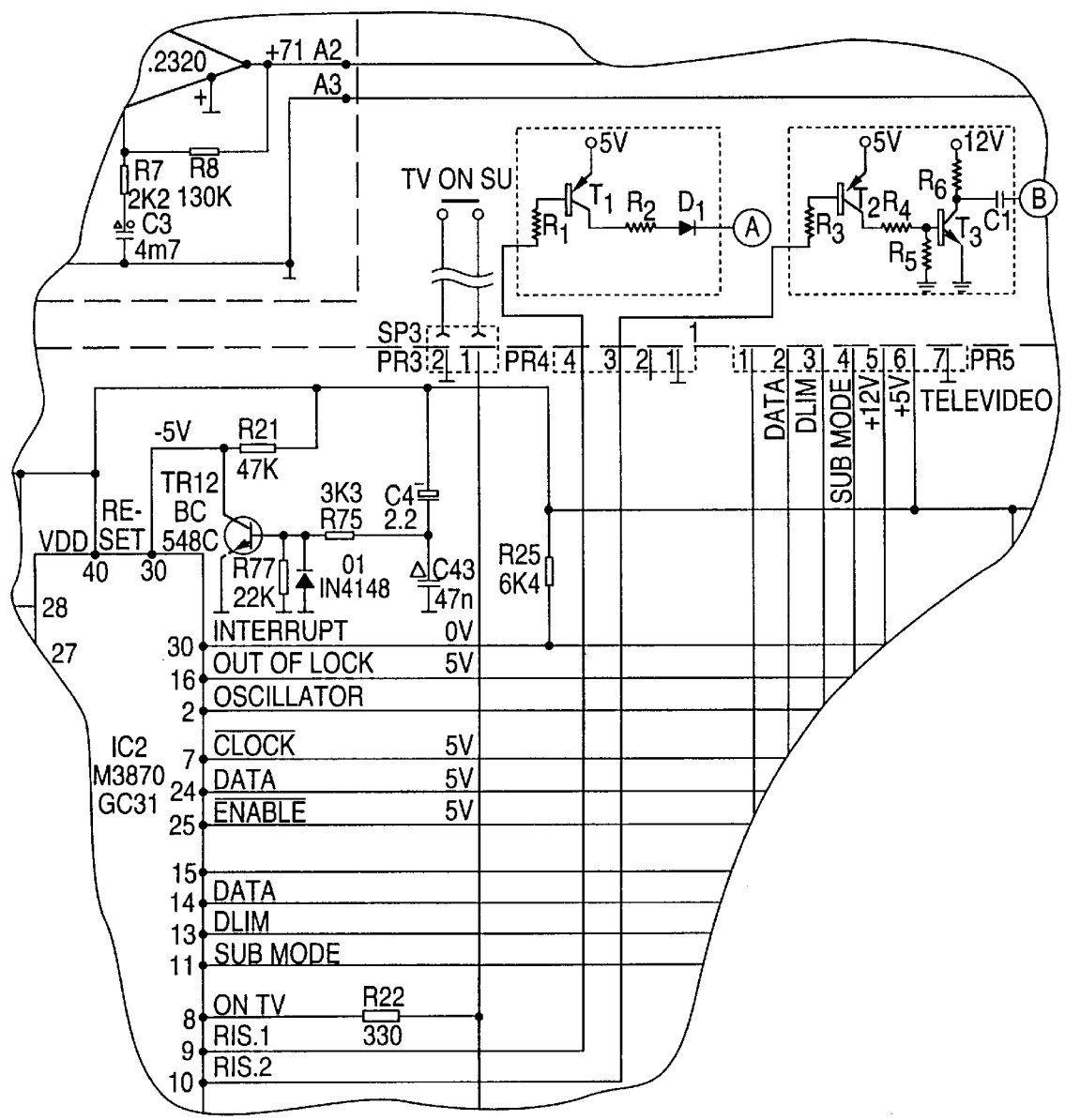
FIG. 5A, FIG. 5B and FIG. 5C are partial circuit diagrams of a commercial TV set as modified according to the present invention.
Figure 5B:
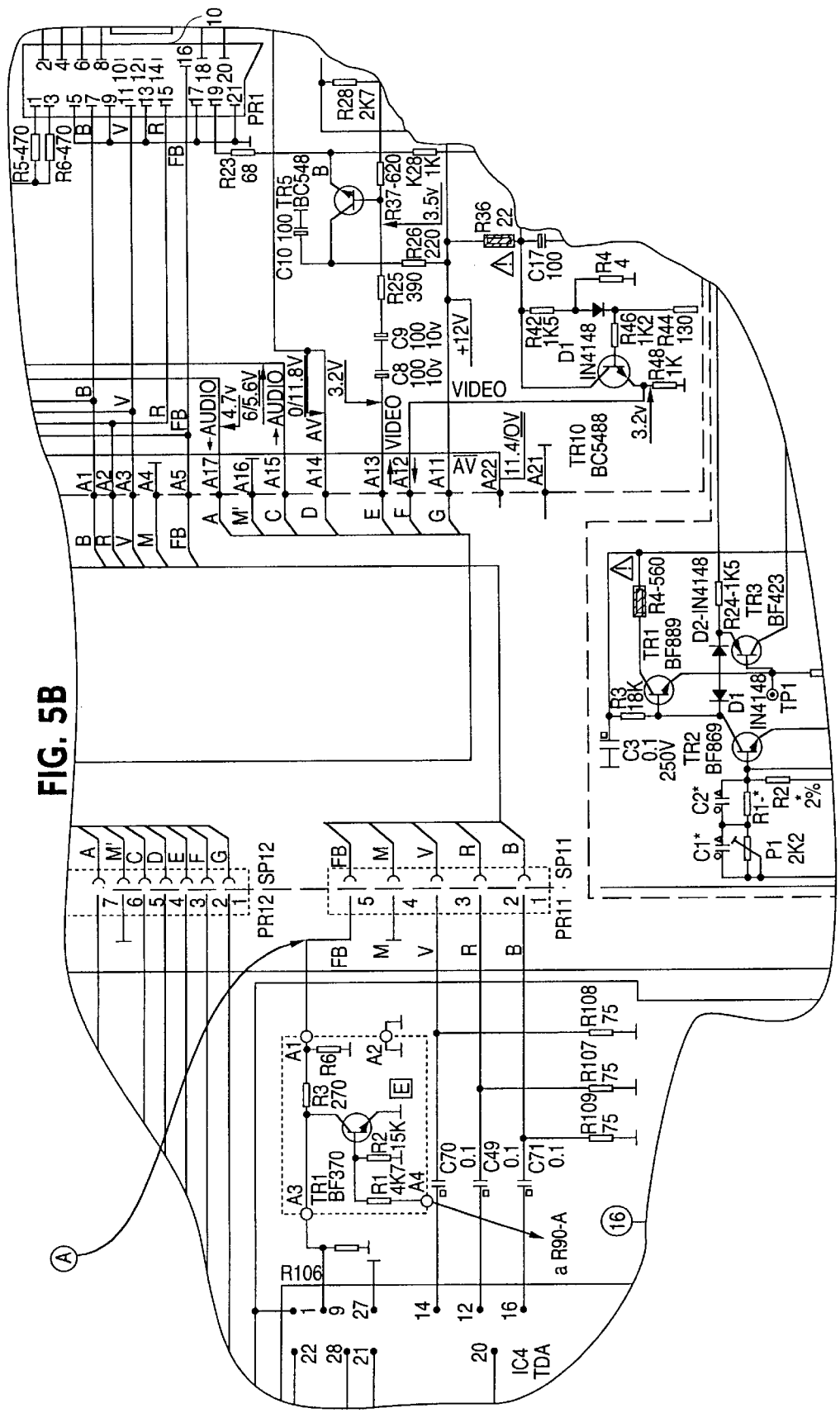
Figure 5C:
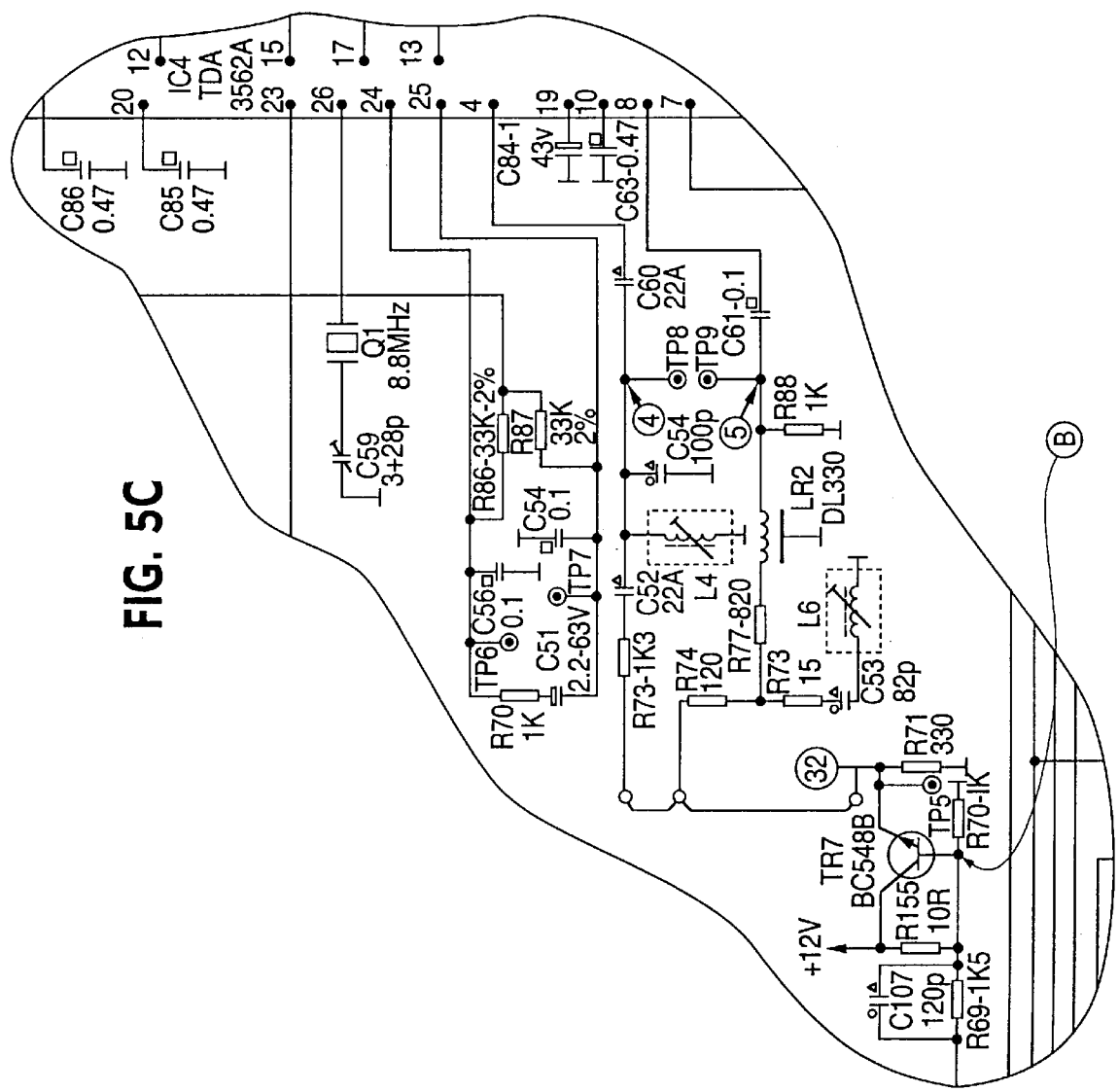

FIGS. 5A and 5C illustrate partial circuit diagrams of a commercial TV set by the Italian firm Voxson SpA, chassis CT9.

In FIG. 5A, the microprocessor Ic2 M3870 GCB1 represents the remote-control signal decoding processing unit 8 described with reference to preceding FIG. 2. The outputs "9" and "10" of the microprocessor are usually not used. In the figure, they respectively represent the first and second supplementary control outputs described with reference to the preceding FIG. 2. The outputs "9" and "10" constitute the control signals of the circuits 12 and 13. The symbols A and B indicate the points at which circuits 12 and 13 are connected inside the TV set.

FIG. 5B shows the point A to which the output of the instantaneous video signal blanking circuit 12 is to be connected. Point A is located on the connection linking the input "16" of the SCART connector 10, on the right top of the figure, to the video blanking input of the integrated circuit IC4 TDA 3562A, which is the "heart" of the luminance/chrominance circuit.

FIG. 5C shows instead the point B to which the output of the video blurring circuit 13 is to be connected. Point B is located inside the luminance/chrominance circuit subsequent to the pick up of the synchronism signal. The signal passing through this point is complete, i.e., comprising both luminance and chrominance information.

An additional embodiment of the present invention allows the video blanking mode to be selectively associated with the reception of some television channels chosen by users and considered by them to be improper for minors. This association may be constant or it may be set for only predetermined hours. The characteristics of the association are stored in the remote-control and can be executed only through the use of the remote-control. In this way, it is possible to obtain a complete, or temporary, exclusion of the above-mentioned channels to those users not having the remote-control. They can, however, use the TV set via the local controls. Alternatively, a TV equipped with two remote-controls could be provided: a first "complete" remote-control equipped with the function of storing and recalling all channels and programs; and a second "restricted" remote-control allowing the recall of the selected programs only, apart from the access to the standard functions. Alternatively, known circuits could be used to provide a numeric "key word" accessible to authorized persons only.

The functions of total and partial "blocking" of some stations are implemented through the decoder 8 of FIG. 2 and can be provided with the features previously described for the immediate video blanking. These additional functions can be realized by appropriate programming of the decoding processing unit 8 and through an increase in its storage capacity. It would also be necessary to provide additional keys, switches and circuitry for subsequent production of codes for regulating the "clock" inside the decoding processing unit 8 and for storing the video blanking in connection with the chosen channels. The indications of the various functions can be visualized on the CRT.

It will be necessary that the TV set be equipped with the functions previously described with reference to FIG. 2 for the instantaneous video blanking and an inner clock controlled by the remote-control keys. The TV set must also have an OSD (on-screen display) or an LED display for indicating:

a) the chosen program;

b) date, hours and minutes;

c) indications for video blocking;

d) date, hours and minutes for start time of blocking; and e) date, hours and minutes for end time of blocking.

The TV set furthermore has to be equipped with means for programming various operations after receiving binary codes sent by the remote-control transmitter in response to the activation of the corresponding key-switches by the user. These operations include:

i) an operation for starting program storage by means of dedicated key. A program-indicating light begins flashing to indicate starting of program storage;

ii) an operation for recalling the program memory location of the desired program. The program is selected by the number keys 0–9. The program-indicating light ends flashing when the location is selected;

iii) an operation for recalling the station to be stored on the program recalled in the previous step by actuating a specific key. A channel-indicating light begins flashing, indicating the recalling operation. The number of the channel is selected by keys 0–9, at which point the channel-indicating light ends flashing;

iv) an operation for storing start of video block. When this operation is initiated, a light indicating date, hours and minutes of starting block begins flashing;

v) an operation for storing end of the block. The indicating light ends flashing. By not indicating dates, the default date is every day;

vi) an operation for setting video block via a dedicated key; and vii) an operation for entering the above-mentioned operations via a dedicated key.

The above operations allow a specific station stored on a definite program site to be video-blocked from a starting time to an ending time, every day or on a particular day.

In a further embodiment, the blurring means 13, controlled by the output c8, could include means for varying the CRT focusing by varying the focusing voltage of the three guns of the CRT, thus reducing the passband below a point which is visible to human eyes. In fact, the defocusing of the electronic beam leads to a drastic decrease in the picture definition on the CRT screen and therefore is equivalent to the reduction of the passband in the luminance/chrominance circuit.

Figure 6:
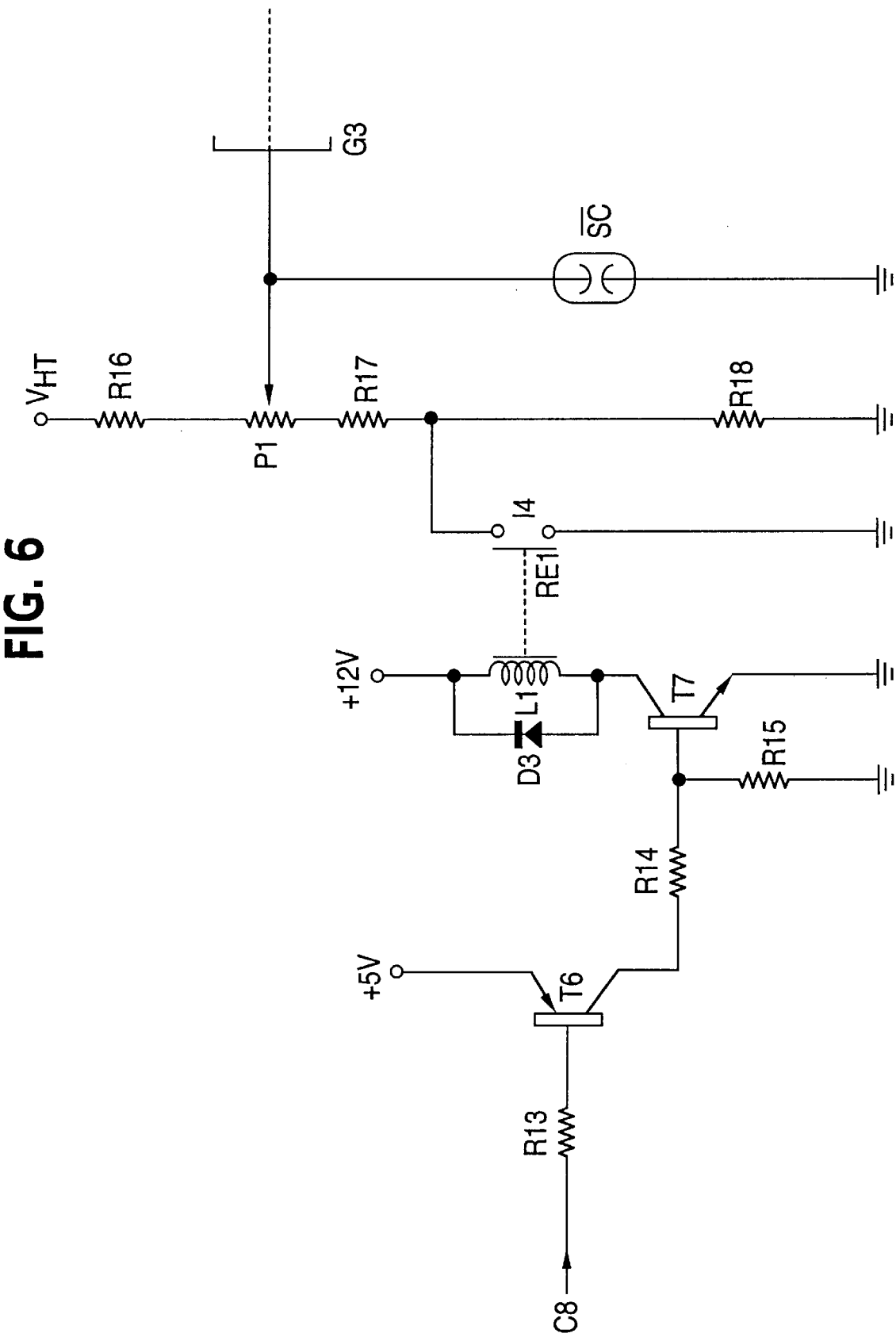
FIG. 6 is an additional embodiment of video signal instantaneous blurring means.

An example of such an embodiment is shown in FIG. 6. In particular, current-limiting resistors R13, R14, R15, R16, R17 and R18, a focus-regulating potentiometer P1, switching transistors T6 and T7, a relay RE1, a coil L1 of the relay RE1 paralleled to a protection diode D3, normally open contacts I4 of the relay RE1, a discharger SC and a focus grid G3 are provided. The second supplementary output c8 is connected to the first end of the resistor R13, whose second end is connected to the base of transistor T6. The emitter of T6 is connected to a DC power supply of +5 V, whereas the collector of the same is connected to the first end of the resistor R14, whose second end is connected to the first end of resistor R15 and to the base to transistor T7, the emitter of the latter being grounded. The collector of the transistor T7 is connected to the first end of the parallel between the coil L1 and the diode D3, the second end of said parallel being connected to the DC power supply of +12 V. A first one of the contacts I4 of RE1 is grounded, whereas the second one is connected to the point Linking R17 and R18. The resistors R16, R17, R18 and the potentiometer P1 are located in series between a high voltage $V_{ht}$ and the ground. The wiper of the potentiometer P1 is connected, as is conventional in TV sets, both to the CRT focus grid G3 and to a discharging device SC.

During operation, if the second supplementary signal c11 (not shown in figure) sets the second supplementary output c8 to a logical low, the transistors T6 and T7 start to conduct and energize the relay RE1, allowing the contacts I4, which in the figure are shown in open position, to close. The resistor R17 is therefore short-circuited to ground with the subsequent variation in the voltage appearing on the potentiometer P1 and thus affecting the picture focusing by the grid G3. An appropriate choice of values of the resistors R16, R17, R18 and P1, as well as an appropriate regulation of the potentiometer P1 for the optimum focus, will allow the desired video signal blurring to be obtained.

What is claimed is:

1. A television signal control system to be used with a remote control and a television set and capable of controlling a television signal having a video portion and an audio portion, said television signal control system comprising:
   a video blanking/unblanking input means to be located in the remote control, including a video blanking/unblanking key, for receiving a video blanking/unblanking command upon operation of said video blanking/unblanking key and for instantaneously generating a video blanking/unblanking command signal upon reception of the video blanking/unblanking command from said video blanking/unblanking key;
   decoding means to be located in the television set for receiving said video blanking/unblanking command signal and instantaneously outputting a video blanking control signal in response to said video blanking/unblanking command signal if the video portion of the television signal is not blanked, and instantaneously outputting a video unblanking control signal in response to said video blanking/unblanking command signal if the video portion of the television signal is blanked; and
   video blanking means to be located in the television set for receiving said video blanking control signal from said decoding means and instantaneously blanking only the video portion of the television signal in response to reception of said video blanking control signal such that the audio portion of the television signal remains audible when the video portion of the television signal is blanked, and for receiving said video unblanking control signal from said decoding means and instantaneously restoring the video portion of the television signal in response to reception of said video unblanking control signal.

2. A television signal control system as claimed in claim 1, wherein said video blanking means comprises an output to be electrically connected to a luminance/chrominance circuit located in the television set and to one of a plurality of outputs of a SCART connector located in the television set.

3. A television signal control system as claimed in claim 2, further comprising:
   a buffer circuit electrically connected to said video blanking means and electrically connectable to the SCART connector for maintaining the nominal input impedance and voltage of the SCART connector.

4. A television signal control system as claimed in claim 1, wherein said video blanking means comprises a switch operable in response to reception of said video blanking control signal for blanking the video portion of the television signal.

5. A television signal control system as claimed in claim 1 further comprising:
   means for displaying a symbol on a screen of the television set when said video blanking means blanks the video portion of the television signal.

6. A television signal control system as claimed in claim 1 further comprising:
   a clock controlled via the remote control; and
   programming means for selecting television channels and time periods for blanking by said video blanking means.

7. A television signal control system to be used with a remote control and a television set and capable of controlling a television signal having a video portion and an audio portion, said television signal control system comprising:
   video blurring input means to be located in the remote control for receiving video blurring commands and for generating a video blurring command signal;
   decoding means to be located in the television set for receiving said video blurring command signal and outputting a video blurring control signal in response to said video blurring command signal if the video portion of the television signal is not blurred; and
   video blurring means to be located in the television set for receiving said video blurring control signal from said decoding means and for instantaneously blurring only the video portion of the television signal in response to reception of said video blurring control signal such that the audio portion of the television signal remains audible when the video portion of the television signal is blurred.

8. A television signal control system as claimed in claim 7 wherein:
   said video blurring means is to be electrically connected to a luminance/chrominance circuit in the television set at a point where the television signal comprises both luminance and chrominance information but where the television signal does not comprise a synchronism signal.

9. A television signal control system as claimed in claim 7 wherein:
   said video blurring means comprises a switch and a low pass filter wherein said video blurring means electrically connects said low pass filter to a luminance/chrominance circuit in the television through said switch in response to reception of said video blurring control signal.

10. A television signal control system as claimed in claim 9, wherein said low pass filter reduces the bandwidth of the television signal to approximately 300 kHz.

11. A television signal control system as claimed in claim 7 wherein:
    said video blurring means comprises a switch and a band pass filter wherein said video blurring means electrically connects said band pass filter to a luminance/chrominance circuit in the television through said switch in response to reception of said video blurring control signal.

12. A television signal control system as claimed in claim 7, wherein said video blurring means comprises a video signal scrambling digital system.

13. A television signal control system as claimed in claim 7, wherein said video blurring means comprises CRT focusing variation means for varying a focusing voltage of each of three guns of a cathode ray tube in the television.

14. A television signal control system as claimed in claim 7 further comprising:

means for displaying a symbol on a screen of the television set when said video blurring means blurs the video portion of the television signal.

15. A television signal control system to be used with a remote control and a television set and capable of controlling a television signal having a video portion and an audio portion, said television picture control system comprising:

video blanking input means to be located in the remote control for receiving video blanking commands and for generating a video blanking command signal;

video blurring input means to be located in the remote control for receiving video blurring commands and for generating a video blurring command signal;

decoding means to be located in the television set for receiving said video blanking command signal and said video blurring signal and outputting a video blanking control signal in response to said video blanking command signal if a video portion of the television signal is not blanked and outputting a video blurring signal in response to said video blurring command signal if the video portion of the television signal is not blurred;

video blanking means to be located in the television set for receiving said video blanking control signal from said decoding means and for instantaneously blanking only the video portion of the television signal in response to the reception of said video blanking control signal; and video blurring means to be located in the television set for receiving said video blurring control signal from said decoding means and for instantaneously blurring only the video portion of the television signal in response to the reception of said video blurring control signal if the video portion of the television signal is not blanked such that the audio portion of the television signal remains audible when the video portion of the television signal is blanked or blurred.

16. A television signal control system as claimed in claim 15, wherein said video blanking means comprises an output to be electrically connected to a luminance/chrominance circuit located in the television set and to one of a plurality of outputs of a SCART connector located in the television set.

17. A television signal control system as claimed in claim 16, further comprising:

a buffer circuit electrically connected to said video blanking means and the SCART connector for maintaining the nominal input impedance and voltage of the SCART connector.

18. A television signal control system as claimed in claim 15, wherein said video blanking means comprises a switch operable in response to reception of said video blanking control signal for blanking the video portion of the television signal.

19. A television signal control system as claimed in claim 16 wherein:

said video blurring means is to be electrically connected to a luminance/chrominance circuit in the television set at a point where the television signal comprises both luminance and chrominance information but where the television signal does not comprise a synchronism signal.

20. A television signal control system as claimed in claim 16 wherein:

said video blurring means comprises a switch and a low pass filter wherein said video blurring means electrically connects said low pass filter to a luminance/chrominance circuit in the television through said switch in response to reception of said video blurring control signal.

21. A television signal control system as claimed in claim 20, wherein said low pass filter reduces the bandwidth of the television signal to approximately 300 kHz.

22. A television signal control system as claimed in claim 15 wherein:

said video blurring means comprises a switch and a band pass filter wherein said video blurring means electrically connects said band pass filter to a luminance/chrominance circuit in the television through said switch in response to reception of said video blurring control signal.

23. A television signal control system as claimed in claim 15, wherein said video blurring means comprises a video signal scrambling digital system.

24. A television signal control system as claimed in claim 15, wherein said video blurring means comprises CRT focusing variation means for varying a focusing voltage of each of three guns of a cathode ray tube in the television.

25. A television signal control system as claimed in claim 15 further comprising:

means for displaying a symbol on a screen of the television set when said video blurring means blurs the video portion of the television signal.

26. A television signal control system as claimed in claim 15 further comprising:

means for displaying a symbol on a screen of the television set when said video blanking means blanks the video portion of the television signal.

27. A television signal control system as claimed in claim 15 further comprising:

a clock controlled via the remote control; and programming means for selecting television channels and time periods for blanking by said video blanking means.

* * * * *